(12) United States Patent
Janjua et al.

(10) Patent No.: US 11,584,655 B2
(45) Date of Patent: Feb. 21, 2023

(54) METHOD FOR MAKING MESOPOROUS MAGNESIUM HYDROXIDE NANOPLATES, AN ANTIBACTERIAL COMPOSITION, AND A METHOD OF REDUCING NITROAROMATIC COMPOUNDS

(71) Applicant: King Fahd University of Petroleum and Minerals, Dhahran (SA)

(72) Inventors: Muhammad Ramzan Saeed Ashraf Janjua, Dhahran (SA); Saba Jamil, Faisalabad (PK); Shanza Rauf Khan, Faisalabad (PK)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 16/597,931

(22) Filed: Oct. 10, 2019

(65) Prior Publication Data
US 2022/0144656 A1 May 12, 2022

Related U.S. Application Data

(60) Provisional application No. 62/842,069, filed on May 2, 2019.

(51) Int. Cl.
| C01F 5/14 | (2006.01) |
| A01N 59/06 | (2006.01) |
| A23L 3/358 | (2006.01) |

(52) U.S. Cl.
CPC ............... *C01F 5/14* (2013.01); *A01N 59/06* (2013.01); *A23L 3/358* (2013.01);
(Continued)

(58) Field of Classification Search
CPC . C01F 5/14; A01N 59/06; A23L 3/358; C01P 2002/72; C01P 2002/76;
(Continued)

(56) References Cited

U.S. PATENT DOCUMENTS

| 7,514,489 B2 | 4/2009 | Granada, Jr. et al. |
| 9,604,854 B2 | 3/2017 | Maddan |
| 2016/0264868 A1 | 9/2016 | Gordon et al. |
| 2017/0209347 A1 | 7/2017 | Das et al. |

FOREIGN PATENT DOCUMENTS

| CN | 104609449 B | 2/2017 |
| CN | 108083302 A | * 5/2018 |
| CN | 108714423 A | 10/2018 |
| RU | 2 422 364 C2 | 2/2011 |

OTHER PUBLICATIONS

Translation of CN 108083302 A via FIT, Chi, 2018 (Year: 2018).*
(Continued)

*Primary Examiner* — Bethany P Barham
*Assistant Examiner* — Ayaan A Alam
(74) *Attorney, Agent, or Firm* — Oblon, McClelland, Maier & Neustadt, L.L.P.

(57) ABSTRACT

A method for producing mesoporous magnesium hydroxide nanoplates involving solvothermal treatment of a solution of a magnesium salt, a base, a glycol, and water is disclosed. The method does not use a surfactant or template in the solvothermal treatment. The method yields mesoporous nanoparticles of magnesium hydroxide having a plate-like morphology with a diameter of 20 nm to 100 nm, a mean pore diameter of 2 to 10 nm, a surface area of 50 to 70 m²/g, and a type-III nitrogen adsorption-desorption BET isotherm with a H3 hysteresis loop. An antibacterial composition containing the mesoporous magnesium hydroxide nanoplates is also disclosed. A method for reducing nitroaromatic compounds with a reducing agent and the mesoporous magnesium hydroxide nanoplates as a catalyst is also disclosed.

15 Claims, 8 Drawing Sheets

(52) U.S. Cl.
CPC ...... *C01P 2002/72* (2013.01); *C01P 2002/76* (2013.01); *C01P 2004/04* (2013.01); *C01P 2004/24* (2013.01); *C01P 2004/51* (2013.01); *C01P 2006/12* (2013.01); *C01P 2006/17* (2013.01)

(58) Field of Classification Search
CPC .............. C01P 2004/04; C01P 2004/24; C01P 2004/51; C01P 2006/12; C01P 2006/01
See application file for complete search history.

(56) References Cited

OTHER PUBLICATIONS

Yu, J., et al., Synthesis and Characterization of Porous Magnesium Hydroxide and Oxide Nanoplates, 2004, Journal of Physical Chemistry, 108, 64-70 (Year: 2004).*

Zou, G. et al., Morphology-tunable synthesis and characterizations of Mg(OH)2 films via a cathodic electrochemical process, 2008, Materials Chemistry and Physics, 107, 85-90 (Year: 2008).*

Taglieri, et al.; Mg(OH)2 nanoparticles produced at room temperature by an innovative, facile, and scalable synthesis route; J Nanopart Res 17; Oct. 6, 2015; 14 Pages.

Pilarska, et al.; Synthesis Of Mg(OH)2 From Magnesium Salts and NH4OH by Direct Functionalisation With Poly(Ethylene Glycols); Physicochem. Probl. Miner. Process 48(2); pp. 631-643; Apr. 16, 2012; 14 Pages.

Balducci, et al.; Recent progress in the synthesis of nanostructured magnesium hydroxide; Royal Society of Chemistry, 19; CrystEngComm; Oct. 3, 2017; 18 Pages.

Pilarska, et al.; Synthesis of magnesium hydroxide and its calcinates by a precipitation method with the use of magnesium sulfate and poly(ethylene glycols); Powder Technology 235; pp. 148-157; Oct. 13, 2012; 11 Pages.

Wang, et al.; Layered mesoporous Mg(OH)2/GO nanosheet composite for efficient removal of water contaminants; RSC Advances; 2013; 9 Pages.

* cited by examiner

METHOD FOR MAKING MESOPOROUS MAGNESIUM HYDROXIDE NANOPLATES, AN ANTIBACTERIAL COMPOSITION, AND A METHOD OF REDUCING NITROAROMATIC COMPOUNDS

CROSS REFERENCE TO RELATED APPLICATIONS

This application claims the benefit of priority of U.S. Provisional Application. No. 62/842,069 filed on May 2, 2019, the entire contents of which are herein incorporated by reference.

STATEMENT OF ACKNOWLEDGEMENT

The inventors acknowledge the support provided by the Deanship of Scientific Research (DSR) King Fand University of Petroleum and Minerals (KFUPM), Kingdom of Saudi Arabia, through funding this work (Project No. SR161009).

BACKGROUND OF THE INVENTION

Field of the Invention

The present invention relates a method of preparing mesoporous magnesium hydroxide nanoplates, an antibacterial composition containing the mesoporous magnesium hydroxide nanoplates, and a method of reducing nitroaromatic compounds using the nanoplates.

Discussion of the Background

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

The synthesis of nanomaterials with particular morphologies is of interest because different morphologies can provide different properties. Various reported morphologies include rods [J. Xu, P. Gao, T. Zhao, Energy Environ. Sci. 2012, 5, 5333], sea-urchins [Y. H. Su, W. H. Lai, W. Y. Chen, M. H. Hon, S. H. Chang, Appl. Phys. Lett. 2007, 90, 181905], flowers [S. Mourdikoudis, T. Altantzis, L. M. Liz-Marziin, S. Bals,I. Pastoriza Santos, J. Perez-Juste, CrystEngComm 2016, 18, 3422; and P. S. Das, A. Dey, A. K. Mandel, N. Dey, A. K. Mukhopadhyay, J. Adv.Ceram. 2013, 2, 173], plates [J. C. Yu, A. Xu, L. Zhang, R. Song, L. Wu, J. Phys. Chem. B. 2004,108, 64], and spheres [L. Ge, X. Jing, J. Wang, S. Jamil, Q. Liu, D. Song, J. Wang, Y. Xie,P. Yang, M. L. Zhang, Cryst. Growth Des. 2010,10, just to name a few. Magnesium is a cheap alkaline earth metal and magnesium nanoscale compounds are largely used in biomedicine [S. Li, X. L. Qiao, J. G. Chen, C. L. Wu, B. Mei, J. Funct. Mater. 2005,11, 001; and J. Zhao, X Zhang, R. Tu, C. Lu, X He, W. Zhang, Cellulose 2014, 21,1859], adsorption [V. Srivastava, Y. Sharma, M. Sillanpaa, Ceram Int. 2015, 41, 6702], ceramics [M. Morales, J. Formosa, E. Xuriguera, M. Niubo, M. Segarra, J. Chimenos, Ceram. Int. 2015, 41, 12137], devices [S. Wu, H. Wang, J. Sun, F. Song, Z. Wang, M. Yang, H. Xi, Y. Xie, H. Gao, J. Ma, X Ma, Y. Hao, IEEE Electron Device Lett. 2016, 37, 990], sensors [S. Shukla, G. Parashar, A. Mishra, P. Misra, B. Yadav, R. Shukla, L. Bali, G. Dubey, Sens. Actuators, B 2004, 98, 5.], and catalysts [M. Shaikh, M. Sahu, P. K. Gavel, G. R. Turpu, S. Khilari, D. Pradhan, K. V. S. Ranganath, Catal. Commun. 2016, 84, 89].

Various morphologies and applications of magnesium hydroxide $(Mg(OH)_2)$ have been reported: for example, their electronic and optical properties due to their small size and high crystallinity. Its nanoneedles and nanolamellas are good reinforcing materials. $Mg(OH)_2$ nanorods act as good catalyzing agents in polymer composites [J. Lv, L. Qiu, B. Qu, Nanotechnology 2004, 15, 1576]. Its nano-forms are largely used as fillers in flame retardant composites because they can undergo endothermic reaction while under the influence of fire. Moreover, $Mg(OH)_2$ is used as a precursor for the synthesis of magnesium oxide nanomaterials. Therefore, morphology-controlled and high yield synthesis of $Mg(OH)_2$ nanomaterial is desirable.

Sol-gel techniques [R. Giorgi, C. Bozzi, L. Dei, C. Gabbiani, B. W. Ninham, P. Baglioni, Langmuir 2005, 21, 8495], microwave/ultrasound-assisted techniques [G. W. Beall, E. S. M. Duraia, F. El-Tantawy, F. Al-Hazmi, A. A. A1-Ghamdi, Powder Technol. 2013, 234, 26; and O. Baidukova, E. V. Skorb, Ultrason. Sonochem. 2016, 31, 423], the precipitation of a magnesium salt with an alkaline solution [W. Jiang, X Hua, Q. Han, X Yang, L. Lu, X Wang, Powder Technol. 2009, 191, 227], and solvothermal treatment [Y. Chen, T. Thou, H. Fang, S. Li, Y. Yao, Y. He, Procedia Eng. 2015, 102, 388; and L. Kumari, W. Z. Li, C. H. Vannoy, R. M. Leblanc, D. Z. Wang, Ceram. Int. 2009, 35, 3355] are commonly used for the synthesis of $Mg(OH)_2$ nanomaterials. Among these methods, solvothermal treatment is most advantageous with respect to the synthesis of well-defined and morphology-controlled products. Ding et al. have reported the synthesis of nanorod, nanotube, nanoneedle, and nanolamella morphologies of $Mg(OH)_2$ by the solvothermal approach [Y. Ding, G. Zhang, H. Wu, B. Hai, L. Wang, Y. Qian, Chem. Mater. 2001, 13, 435]. Yu et al. have reported the synthesis of porous $Mg(OH)_2$ nanoplates by a hydrothermal method P. C. Yu, A. Xu, L. Zhang, R. Song, L. Wu, J. Phys. Chem. B. 2004, 108, 64]. Fan et al. have reported the synthesis of nanowires of $Mg(OH)_2$ by the solvothermal approach [W. Fan, X. Song, S. Sun, X Zhao, J. Cryst. Growth 2007, 305, 167]. Zhao et al. have reported the synthesis and antibacterial activity of irregular $Mg(OH)_2$ nanoplatelets. Their reported nanoplatelets were of large size and had irregular morphology. The structure of those nanoplatelets was not porous [J. Zhao, X. Zhang, R.. Tu, C. Lu, X. He, W. Zhang, Cellulose 2014, 21, 1859]. The synthesis of very thin walled and porous $Mg(OH)_2$ nanoplatelets without the use of any surfactant or template has not been reported. Moreover, the antibacterial and catalytic applications of the nanoplatelets have not been studied previously.

In view of the foregoing, one objective of this disclosure is to provide methods of synthesizing mesoporous $Mg(OH)_2$ nanoplates by the solvothermal method without the use of a surfactant or template.

SUMMARY OF THE INVENTION

The present disclosure relates to a method for making mesoporous magnesium hydroxide nanoplates with a diameter of 20 nm to 100 nm, involving solvothermal treatment of aqueous mixture of a magnesium salt, a base, and a glycol having 2 to 6 carbon atoms at a temperature of 140 to 220° C. for 1 to 24 hours, wherein the aqueous mixture is substantially free of a surfactant, a template, or both.

In some embodiments, the magnesium salt is a magnesium halide.

In preferred embodiments, the magnesium halide is magnesium chloride.

In some embodiments, the magnesium salt is present in the aqueous mixture in an amount of 15 to 25 g/L.

In preferred embodiments, the base is a monoacidic base.

In preferred embodiments, the base is an acetate base.

In preferred embodiments, the base is sodium acetate.

In preferred embodiments, the base is present in the aqueous mixture in an amount of 25 to 40 g/L.

In some embodiments, the mole ratio of the amount of base present in the aqueous mixture to the amount of magnesium present in the aqueous mixture 1:1 to 3:1.

In preferred embodiments, the glycol is ethylene glycol.

In preferred embodiments, the glycol is present in the aqueous mixture in an amount of 15 to 25 volume %, based on a total volume of the aqueous mixture.

In some embodiments, the aqueous mixture is formed by mixing the magnesium salt and the base in water for 1 to 30 minutes, followed by the addition of the glycol.

In some embodiments, after the addition of the glycol, the aqueous mixture is mixed for 1 to 30 minutes before the heating.

In some embodiments, the mesoporous magnesium hydroxide nanoplates have a mean pore diameter of 2 to 10 nm, a surface area of 50 to 70 $m^2/g$, and a type-III nitrogen adsorption-desorption BET isotherm with a H3 hysteresis loop.

In preferred embodiments, the mesoporous magnesium hydroxide nanoplates have a multimodal size distribution.

The disclosure also relates to an antibacterial composition comprising the mesoporous magnesium hydroxide nanoplates that shows activity against *E. coli, S. aureus*, and/or *K pneumoniae*.

In some embodiments, the antibacterial composition further comprises a surfactant, a fragrance, a dye, a dispersant, a water softener, a bleaching agent, and/or a foaming agent.

In some embodiments, the antibacterial composition further comprises a buffer or pH-control additive.

The disclosure also relates to a method of reducing a nitroaromatic compound involvint mixing together the nitroaromatic compound, a reducing agent, and the mesoporous magnesium hydroxide nanoplates.

In preferred embodiments, the reducing agent is sodium borohydride.

BRIEF DESCRIPTION OF THE DRAWINGS

The foregoing paragraphs have been provided by way of general introduction, and are not intended to limit the scope of the following claims. A more complete appreciation of the invention and many of the attendant advantages thereof will be readily obtained as the same becomes better understood by reference to the following detailed description when considered in connection with the accompanying drawings, wherein:

DETAILED DESCRIPTION OF THE INVENTION

Figure 1A:
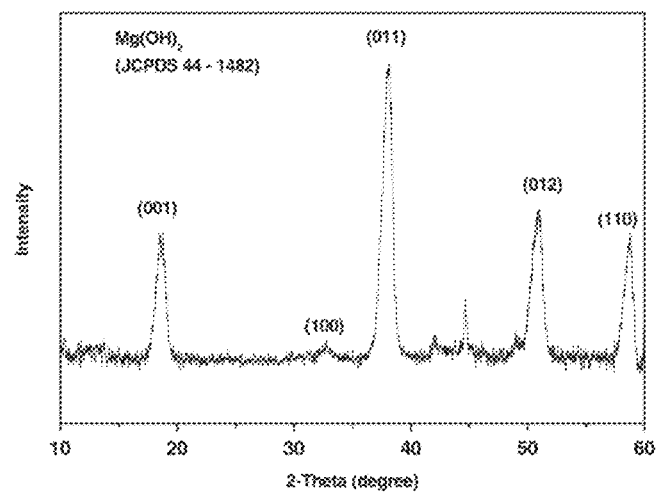
FIG. 1A shows a powder XRD pattern of the $Mg(OH)_2$ nanoplates.

In the following description, it is understood that other embodiments may be utilized and structural and operational changes may be made without departure from the scope of the present embodiments disclosed herein.

Definitions

The phrase "substantially free", unless otherwise specified, describes a particular component being present in an amount of less than about 1 wt %, preferably less than about 0.5 wt. %, more preferably less than about 0.1 wt. %, even more preferably less than about 0.05 wt %, yet even more preferably 0 wt. %, relative to a total weight of the composition being discussed.

As used herein, the terms "optional" or "optionally" means' that the subsequently described event(s) can or cannot occur or the subsequently described component(s) may or may not be present (e.g., 0 wt. %).

As used herein, "inhibit" means prevent, hinder, reverse, remove, lessen, reduce an amount of, or delay the growth of a bacteria.

As used herein, "zone of inhibition" means an area of suitable bacterial growth medium around a sample of an antibiotic substance in which bacteria do not grow due to action of the antibiotic substance.

As used herein, the term "solvothermal method" refers to a method of producing chemical compounds using a chemical reaction that takes place in a solvent other than pure water, preferably at a pressure above 1 bar and at a temperature above the boiling point of the solvent at atmospheric pressure. A solvothermal method differs from a hydrothermal method in that the latter is restricted to using only water as the solvent. Typically, if water is the only solvent used, the term hydrothermal method is preferred and solvothermal method refers solely to methods that use solvents other than or in addition to water.

Method for Preparing Mesoporous Magnesium Hydroxide Nanoplates

According to a first aspect, the present disclosure relates to methods of making mesoporous magnesium hydroxide nanoplates. Generally, the method involves solvothermal techniques whereby a mixture of a magnesium source, a base, a glycol, and water are heated under solvothermal conditions. One advantage of the disclosed methods is that magnesium hydroxide nanoplates can be formed with regular morphology without the need forsurfactants and/or templates A magnesium salt, a base, and a glycol having 2 to 6 carbons, preferably 2 to 5 carbons, preferably 2 to 4 carbons, preferably 2 to 3 carbons, preferably 2 carbons may be mixed together in water to form an aqueous mixture. This aqueous mixture is preferably substantially free of a surfactant, a template, or both. The aqueous mixture may then be subjected to a solvothermal method at a temperature of 140 to 220° C., preferably 150 to 210° C., preferably 160 to 200° C., preferably 170 to 190° C., preferably 175 to 185° C. for a period of time from 2 to 24 hours, preferably 3 to 20 hours, preferably 4 to 16 hours, preferably 5 to 12 hours, preferably 6 to 10 hours, preferably 7 to 9 hours.

In preferred embodiments, the aqueous mixture is composed of a solvent portion and a solute portion. In preferred embodiments, the solvent portion is 55 to 99% (v/v), preferably 60 to 95% (v/v), preferably 70 to 90% (v/v), preferably 75 to 85% (v/v), preferably 80% (v/v) water. In preferred embodiments, the remaining volume percent of the solvent portion is the glycol having 2 to 6 carbons. While other organic solvents may be used that are miscible with water, in preferred embodiments they are not. Such organic solvents may include, but are not limited to, methanol, ethanol, acetone, acetaldehyde, acetic acid, acetonitrile, 2-butoxyethanol, butyric acid, diethanolamine, diethylenetriamine, dimethylformamide, dimethoxyethane, dimethyl sulfoxide, 1,4-dioxane, ethylamine, formic acid, furfuryl alcohol, methyl diethanolamine, methyl isocyanide, N-methyl-2-pyrrolidone, 1-propanol, 2-propanol, propanoic acid, pyridine, tetrahydrofuran, or the like. In some embodiments, such organic solvents may be present in an amount of 0 to 40% (v/v), preferably 0 to 35% (v/v), preferably 0 to 25% (v/v), preferably 0 to 15% (v/v), preferably 0 to 5% (v/v), preferably 0 to 1% (v/v) based on the total volume of the solvent portion. In preferred embodiments, such organic solvents are not present in the solvent portion. In preferred embodiments, the only organic solvent present in the solvent portion is the glycol having 2 to 6 carbons.

In preferred embodiments, the solute portion of the aqueous mixture comprises a magnesium salt. In preferred embodiments, the magnesium salt is a water-soluble magnesium salt having a solubility greater than 1 g per 100 mL, preferably greater than 5 g per 100 mL, preferably greater than 10 per 100 mL, preferably greater than 25 g per 100 mL, preferably greater than 50 g per 100 mL of water at 20° C. Such water-soluble magnesium salts may include, but are not limited to, magnesium acetate, magnesium bromate, magnesium bromide, magnesium chlorate, magnesium chloride, magnesium chromate, magnesium fluorosilicate, magnesium formate, magnesium iodate, magnesium iodide, magnesium molybdate, magnesium nitrate, magnesium perchlorate, magnesium selenite, magnesium sulfate, and magnesium thiosulfate. The water-soluble magnesium salt may be used in a hydrated or anhydrous state. In preferred embodiments, the water-soluble magnesium salt is a magnesium halide, preferably magnesium chloride, preferably magnesium chloride hydrate. In preferred embodiments, the magnesium salt is present in the aqueous mixture in an amount of 5 to 35 g/L, preferably 10 to 30 g/L, preferably 15 to 25 g/L, preferably 16 to 24 g/L, preferably 17 to 23 g/L, preferably 18 to 22 g/L, preferably 18.5 to 21 g/L, preferably 19 to 20 g/L, preferably 19.01 to 19.5 g/L, preferably 19.02 to 19.1 g/L, preferably 19.03 to 19.06 g/L, preferably 19.05 g/L based on the total volume of the aqueous mixture.

In preferred embodiments, the solute portion of the aqueous mixture further comprises a base. In preferred embodiments, the base is a monoacidic base. Such a monoacidic base may include, but is not limited to, lithium hydroxide, sodium hydroxide, potassium hydroxide, rubidium hydroxide, cesium hydroxide, ammonium hydroxide, lithium bicarbonate, sodium bicarbonate, potassium bicarbonate, rubidium bicarbonate, cesium bicarbonate, ammonium bicarbonate, lithium acetate, sodium acetate, potassium acetate, rubidium acetate, cesium acetate, ammonium acetate, or a hydroxide, bicarbonate, or acetate salt of an organoammonium cation having a general formula $NH_{4-x}R_x$, where x=1, 2, 3, or 4, and R is an aryl, an alkyl, an alkylaryl, or an arylalkyl group. As used herein, "aryl" means a substituent derived from an aromatic ring, such as phenyl, benzyl, tolyl, xylyl, napthyl, halophenyl, pyramidyl, furyl, thiophenyl, pyrazinyl, quinolinyl, cinnamyl, styryl, and the like. As used herein, "alkyl" means a saturated straight chain or branched noncyclic hydrocarbon having from 1 to 30 carbon atoms. Representative saturated straight chain alkyls include methyl, ethyl, n-propyl, n-butyl, n-pentyl, n-hexyl, n-heptyl, n-octyl, n-nonyl, n-decyl and the like. Representative saturated branched alkyls include isopropyl, sec-butyl, isobutyl, tert-butyl, isopentyl, 2-methylbutyl, 3-methylbutyl, 2,2-dimethylbutyl, 2,3-dimethylbutyl, 2-methylpentyl, 3-methylpentyl, 4-methylpentyl, 2-methylhexyl, 3-methylhexyl, 4-methylhexyl, 5-methylhexyl, 2,3-dimethylbutyl, 2,3-dimethylpentyl, 2,4-dimethylpentyl, 2,3-dimethyleyl, 2,4-dimethylhexyl, 2,5-dimethyleyl, 2,2-dimethylpentyl, 2,2-dimethylhexyl, 3,3-dimethylpentyl, 3,3-dimethylhexyl, 4,4-dimethylexyl, 2-ethylpentyl, 3-ethylpentyl, 2-ethylhexyl, 3-ethylhexyl, 4-ethylhexyl, 2-methyl-2-ethylpentyl, 2-methyl-3-ethylpentyl, 2-methyl-4-ethylpentyl, 2-methyl-2-ethylhexyl, 2-methyl-3-ethylhexyl, 2-methyl-4-ethylhexyl, 2,2-diethylpentyl, 3,3-dethylhexyl, 2,2-dethylhexyl, 3,3-dethylhexyl and the like. As used herein, "arylalkyl" means an alkyl group as defined above substituted with an aryl group as defined about where the alkyl portion is connected to the rest of the organoammonium cation. As used herein, "alkylaryl" means an aryl group as defined above substituted with an alkyl group as defined above where the aryl portion is connected to the rest of the organoammonium cation. In preferred embodiments, an acetate base is used, preferably sodium acetate. In preferred embodiments, the base is present in the aqueous mixture in an amount of 5 to 60 g/L, preferably 10 to 55 g/L, preferably 15 to 50 g/L, preferably 20 to 45 g/L, preferably 25 to 40 g/L, preferably 30 to 35 g/L, preferably 31 to 34 g/L, preferably 32 to 33 g/L, preferably 32.5 to 33.9 g/L, preferably 32.75 to 32.85 g/L, preferably 32.80 to 32.83 g/L, preferably 32.81 to 32.82 g/L based on the total volume of the aqueous mixture.

In preferred embodiments, the ratio of the moles of base present in the aqueous mixture to the moles of magnesium present in the aqueous mixture is 1:1 to 3:1, preferably 1.5:1 to 2.5:1, preferably 1.75:1 to 2.25:1, preferably 2:1.

In preferred embodiments, the glycol having 2 to 6 carbons may be ethylene glycol, propylene glycol, 1,2-butanediol, 2,3-butanediol, 1,2-pentanediol, 2,3-pentanediol, 1,2-hexanediol, 2,3-hexanediol, or 3,4-hexanediol. In preferred embodiments, ethylene glycol is used. In preferred embodiments, the glycol is present in the aqueous mixture in an amount of to 45% (v/v), preferably 10 to 35% (v/v), preferably 15 to 25% (v/v), preferably 16 to 24% (v/v), preferably 17 to 23% (v/v), preferably 18 to 22% (v/v), preferably 20% (v/v) based on the total volume of the aqueous mixture. In preferred embodiments, ethylene glycol is the only glycol used. While mixtures of glycols satisfying the above criteria may be used, preferably a single glycol is used.

The aqueous mixture described above is preferably substantially free of a surfactant, template, or both. As defined here, a surfactant is a compound that lowers the surface tension (or interfacial tension) between two liquids, between a liquid and a gas, or between a liquid and a solid. The surfactant may be a nonionic surfactant, an anionic surfactant, a cationic surfactant, a viscoelastic surfactant, or a zwitterionic surfactant. The surfactant may also be a gemini surfactant of any of the types listed previously. The surfactant may serve a role as a water-wetting agent, a defoamer, a foamer, a detergent, a dispersant, or an emulsifier.

A surfactant molecule comprises one or more hydrophilic head units attached to one or more hydrophobic tails. The tail of most surfactants comprises a hydrocarbon chain, which can be branched, linear, or aromatic. Fluorosurfactants have fluorocarbon chains. Siloxane surfactants have siloxane chains. Gemini surfactant molecules comprise two or more hydrophilic heads and two or more hydrophobic tails.

Many surfactants include a polyether chain terminating in a highly polar anionic group. The polyether groups often comprise ethoxylated (polyethylene oxide-like) sequences inserted to increase the hydrophilic character of a surfactant. Alternatively, polypropylene oxides may be inserted to increase the lipophilic character of a surfactant.

Anionic surfactants contain anionic functional groups at their head, such as sulfate, sulfonate, phosphate, and carboxylate. The anionic surfactant may be an alkyl sulfate, an alkyl ether sulfate, an alkyl ester sulfonate, an alpha olefin sulfonate, a linear alkyl benzene sulfonate, a branched alkyl benzene sulfonate, a linear dodecylbenzene sulfonate, a branched dodecylbenzene sulfonate, an alkyl benzene sulfonic acid, a dodecylbenzene sulfonic acid, a sulfosuccinate, a sulfated alcohol, a ethoxylated sulfated alcohol, an alcohol sulfonate, an ethoxylated and propoxylated alcohol sulfonate, an alcohol ether sulfate, an ethoxylated alcohol ether sulfate, a propoxylated alcohol sulfonate, a sulfated nonyl phenol, an ethoxylated and propoxylated sulfated nonyl phenol, a sulfated octyl phenol, an ethoxylated and propoxylated sulfated octyl phenol, a sulfated dodecyl phenol, and an ethoxylated and propoxylated sulfated dodecyl phenol. Other anionic surfactants include ammonium lauryl sulfate, sodium lauryl sulfate (sodium dodecyl sulfate, SLS, or SDS), and related alkyl-ether sulfates sodium laureth sulfate (sodium lauryl ether sulfate or SLES), sodium myreth sulfate, docusate (dioctyl sodium sulfosuccinate), perfluorooctanesulfonate (PFOS), perfluorobutanesulfonate, alkyl-aryl ether phosphates, and alkyl ether phosphates.

Cationic surfactants have cationic functional groups at their head, such as primary and secondary amines. Cationic surfactants include octenidine dihydrochloride; cetrimonium bromide (CTAB), cetylpyridinium chloride (CPC), benzalkonium chloride (BAC), benzethonium chloride (BZT), dimethyldioctadecylammonium chloride, and dioctadecyldimethylammonium bromide (DODAB).

Zwitterionic (amphoteric) surfactants have both cationic and anionic groups attached to the same molecule. Zwitterionic surfactants include CHAPS (3-[(3-cholamidopropyl) dimethylammonio]-1-propanesulfonate), cocamidopropyl hydroxysultaine, ocamidopropyl betaine, phospholipids, and sphingomyelins.

Nonionic surfactants have a polar group that does not have a charge. These include long chain alcohols that exhibit surfactant properties, such as cetyl alcohol, stearyl alcohol, cetostearyl alcohol, oleyl alcohol, and other fatty alcohols. Other long chain alcohols with surfactant properties include polyethylene glycols of various molecular weights [Pilarska, et. al. 2012, Physicochem. Probl. Miner. Process. 48, 2, 631-643], polyethylene glycol alkyl ethers having the formula CH3-(CH2)10-16-(O—C2H4)1-25-0H, such as octaethylene glycol monododecyl ether and pentaethylene glycol monododecyl ether; polypropylene glycol alkyl ethers having the formula: CH3- (CH2)10-16-(O—C3H6)1 25-0H; glucoside alkyl ethers having the formula CH3-(CH2)10-16 0-glucoside)1-3-0H, such as decyl glucoside, lauryl glucoside, octyl glucoside; polyethylene glycol octylphenyl ethers having the formula C8H17-(C6H4)—(O—C2H4)1-25-0H, such as Triton X-100; polyethylene glycol alkylphenyl ethers having the formula C9H19 (C6H4)—(O—C2H4)1-25-0H, such as nonoxynol-9; glycerol alkyl esters such as glyceryl laurate; polyoxyethylene glycol sorbitan alkyl esters such as polysorbate, sorbitan alkyl esters, cocamide MEA, cocamide DEA, dodecyldimethylamine oxide, block copolymers of polyethylene glycol and polypropylene glycol, such as poloxamers, and polyethoxylated tallow amine (POEA).

A dendritic surfactant molecule may include at least two lipophilic chains that have been joined at a hydrophilic center and have a branch-like appearance. In each dendritic surfactant, there may be from about 2 lipophilic moieties independently to about 4 lipophilic moieties attached to each hydrophilic group, or up to about 8 lipophilic moieties attached to the hydrophilic group for example. "Independently" as used herein with respect to ranges means that any lower threshold may be combined with any upper threshold. The dendritic surfactant may have better repulsion effect as a stabilizer at an interface and/or better interaction with a polar oil, as compared with other surfactants. Dendritic surfactant molecules are sometimes called "hyperbranched" molecules.

A dendritic extended surfactant is a dendritic surfactant having a non-ionic spacer arm between the hydrophilic group and a lipophilic tail. For example, the non-ionic spacer-arm extension may be the result of polypropoxylation, polyethoxylation, or a combination of the two with the polypropylene oxide next to the tail and polyethylene oxide next to the head. The spacer arm of a dendritic extended surfactant may contain from about 1 independently to about 20 propoxy moieties and/or from about 0 independently to about 20 ethoxy moieties. Alternatively, the spacer arm may contain from about 2 independently up to about 16 propoxy moieties and/or from about 2 independently up to about 8 ethoxy moieties. "Independently" as used herein with respect to ranges means that any lower threshold may be combined with any upper threshold. The spacer arm extensions may also be formed from other moieties including, but not necessarily limited to, glyceryl, butoxy, glucoside, isosorbide, xylitols, and the like. For example, the spacer arm of a dendritic extended surfactant may contain both propoxy and ethoxy moieties: The polypropoxy portion of the spacer arm may be considered lipophilic; however, the spacer arm may also contain a hydrophilic portion to attach the hydrophilic group. The hydrophilic group may generally be a polyethoxy portion having about two or more ethoxy groups. These portions are generally in blocks, rather than being randomly mixed. Further, the spacer arm extension may be a poly-propylene oxide chain.

Another type of surfactant is a viscoelastic surfactant (VES). Conventional surfactant molecules are characterized by having one long hydrocarbon chain per surfactant headgroup. In a viscoelastic gelled state these molecules aggregate into worm-like micelles. A viscoelastic gel is a gel that has elastic properties, meaning that the gel at least partially returns to its original form when an applied stress is removed. Typical viscoelastic surfactants include N-erucyl-N,N-bis(2-hydroxyethyl)-N-methyl ammonium chloride and potassium oleate, solutions of which form gels when mixed with inorganic salts such as potassium chloride and/or with organic salts such as sodium salicylate. Previously described surfactants may also be considered viscoelastic surfactants.

As used herein, a template refers to a material added to the aqueous mixture during the preparation of magnesium hydroxide particles that may direct or influence the crystallization of magnesium hydroxide to affect the size, shape, porosity, or other physical characteristic of the magnesium hydroxide particle and is not a surfactant. Examples of such templates include, but are not limited to, gelatin [Femitha, et. al., 2016, Green Chemistry and Technology Letters, 2, 2, 87-90], cellulose gel [Han, et. al., 2015, ACS Sustainable Chem. Eng. 3, 8, 1853-1859], agar [Ambrose, et. al., 1983, Proc. Indian Acad. Sci, 92, 3, 237-247], spider silk [Dimitrovic, et. al., 2018, Chemical Industry, 72, 1, 23-28], walnut shell [Zamani, et. al. 2019, Green Processing and Synthesis, 8, 1, 199-206], or a magnesium carbonate hydroxide [Chen, et. al., 2018, Journal of Central South University, 25, 4, 729-735].

In some embodiments, the components of the aqueous mixture are added at the same time. In preferred embodiments, the aqueous mixture is formed by mixing the magnesium salt and the base in water before adding the glycol. In some embodiments, there is a first mixing period that the combination of water, magnesium salt, and base is subjected to before adding the glycol. In preferred embodiments, this first mixing period is 1 to 30 minutes, preferably 5 to 25 minutes, preferably 10 to 20 minutes, preferably 15 minutes. Following this first mixing period the glycol may be added. In some embodiments, after adding the glycol, there is a second mixing period before heating. In preferred embodiments, the second mixing period is 1 to 30 minutes, preferably 5 to 25 minutes, preferably 10 to 20 minutes, preferably 15 minutes.

In some embodiments, following the second mixing period the aqueous mixture is heated to 140 to 220° C. and maintained at that temperature for a period of time to allow for the formation of the nanoplates. In preferred embodiments, the aqueous mixture is heated to 140 to 220° C., preferably 150 to 210° C., preferably 160 to 200° C., preferably 170 to 190° C., preferably 175 to 185° C., preferably 180° C. In preferred embodiments, the heating step is performed under solvothermal conditions. In preferred embodiments, the heating is maintained for a period of time from 2 to 24 hours, preferably 3 to 20 hours, preferably 4 to 16 hours, preferably 5 to 12 hours, preferably 6 to 10 hours, preferably 7 to 9 hours. In preferred embodiments, the solvothermal reaction is performed in a vessel capable of withstanding an internal pressure of 1200 to 3500 psig, preferably 1500 to 3450 psig, preferably 1750 to 3400 psig, preferably 1800 to 3350 psig, preferably 1900 to 3300 psig. In preferred embodiments, the vessel is lined with polytetrafluoroethylene (PTFE). The use of a vessel capable of withstanding elevated internal pressures is required to meet the criteria outlined above for the method to qualify as a "solvothermal" method.

Following the heating step, the nanoplates may be collected by any solid-liquid separation technique known to those of ordinary skill in the art, for example, filtration, decantation, centrifugation, or the like, but excluding techniques such as evaporation. In preferred embodiments, the nanoplates are collected by centrifugation at 500 to 5000 rpm, preferably 750 to 4500 rpm, preferably 1000 to 4000 rpm to form a pellet. In some embodiments, this pellet may be washed with a solvent to remove any impurities from the mesoporous magnesium hydroxide nanoplates. In preferred embodiments the solvent is one in which magnesium hydroxide has a solubility below 0.1 g per 100 mL, preferably below 0.05 g per 100 mL, preferably below 0.01 g per 100 mL, preferably below 0.005 g per 100 mL, preferably below 0.001 g per 100 mL, preferably below 0.00064 g per 100 mL of solvent at 25° C. Examples of such solvents include but are not limited to distilled water, methanol, ethanol, and acetone. In some embodiments, the pellet is washed more than one time. In preferred embodiments, the pellet is washed with more than one solvent. In preferred embodiments, the pellet is washed more than one time with a first solvent, then more than one time with a second solvent. In some embodiments, the pellet may be washed additional times with additional solvents. In preferred embodiments, the first solvent is water and the pellet is washed with water three times. In preferred embodiments, the second solvent is methanol and the pellet is washed with methanol three times. Following the washings, the pellet may be dried, for example, by allowing the pellet to dry in ambient atmosphere, an inert atmosphere, or by subjecting the pellet tor vacuum. In preferred embodiments, the pellet is dried under vacuum. In some embodiments, the pellet is dried at room temperature. In preferred embodiments, the pellet is dried at 30 to 90° C., preferably 40 to 80° C., preferably 50 to 70° C., preferably at 60° C.

In preferred embodiments, the mesoporous magnesium hydroxide nanoplates produced using the method have a diameter of 1Q to 200 nm, preferably 11 to 190 rim, preferably 12 to 180 nm, preferably 13 to 170 nm, preferably 14 to 160 nm, preferably 15 to 150 nm, preferably 16 to 140 nm, preferably 17 to 130 nm, preferably 18 to 120 nm, preferably 19 to 110 nm, preferably 20 to 100 nm. In some embodiments, the mesoporous magnesium hydroxide nanoplates have a multimodal distribution of diameters where the mean still falls within the aforementioned range. In preferred embodiments, the multimodal distribution of diameters is bimodal. Preferably, a first mode of the distribution of diameters is 10 to 60 nm, preferably 15 to 55 nm, preferably 20 to 50 nm, preferably 25 to 45 nm. Preferably, a second mode of the distribution of diameters is 60 to 100 run, preferably 65 to 95 rim, preferably 70 to 90 nm. In preferred embodiments, the second mode is predominant. In preferred embodiments, the mesoporous magnesium hydroxide nanoplates are monodisperse with a coefficient of variation, defined as the ratio of the standard deviation to the mean diameter, of less than 10%, preferably less than 9%, preferably less than 8%, preferably less than 7%, preferably less than 6%, preferably less than 5%, preferably less than 4%, preferably less than 3%, preferably less than 2%. In embodiments with a multimodal distribution of diameters, the nanoplates may be monodisperse as per the above definition centered around each of the modes. In preferred embodiments, the mesoporous magnesium hydroxide nanoplates have a uniform shape similar to that of a circular disc. The flat portion of the nanoplates may be described using a circularity defined as $4\pi(Area)/(Perimeter)^2$ which may vary from 0 for a 1-dimensional object to 1 for a perfect circle. In preferred embodiments, the mesoporous magnesium hydroxide nanoplates have a circularity of at least 0.6, preferably at least 0.7, preferably at least 0.8, preferably at least 0.9.

In preferred embodiments, the mesoporous magnesium hydroxide nanoplates have a uniform shape with a circularity coefficient of variation, defined as the ratio of the standard deviation to the mean circularity, of less than 10%, preferably less than 9%, preferably less than 8%, preferably less than 7%, preferably less than 6%, preferably less than 5%, preferably less than 4%, preferably less than 3%, preferably less than 2%. In preferred embodiments, the plates have a thickness of 0.5 to 30 nm, preferably 1 to 25 nm, preferably 2 to 20 nm, preferably 5 to 15 nm. In preferred embodiments, the plates are hollow, having a thin-walled shell surrounding an interior void. In preferred embodiments, the thin-walled shell has a thickness of 0.1 to 10 nm, preferably 0.5 to 7.5 nm, preferably 1 to 5 nm.

In preferred embodiments, the mesoporous magnesium hydroxide nanoplates have a mean pore diameter of 2 to 50 nm, preferably 2.5 to 40 nm, preferably 3 to 30 nm, preferably 3.5 to 20 nm, preferably 4 to 10 nm, preferably 5 to 9 nm. In preferred embodiments, these pores are of uniform size, having a coefficient of variation less than 10%, preferably less than 9%, preferably less than 8%, preferably less than 7%, preferably less than 6%, preferably less than 5%, preferably less than 4%, preferably less than 3%, preferably less than 2%. In preferred embodiments, the pores are ordered, meaning that they have a regular arrangement that repeats throughout the volume of the nanoplate. In preferred embodiments, the mesoporous magnesium hydroxide nanoplates have a surface area of 10 to 110 $m^2/g$, preferably 20 to 100 $m^2/g$, preferably 30 to 90 $m^2/g$, preferably 40 to 80 $m^2/g$, preferably 50 to 70 $m^2/g$, preferably 55 to 65 $m^2/g$, preferably 57.5 to 62.5 $m^2/g$, preferably 59 to 60 $m^2/g$.

In preferred embodiments, the mesoporous magnesium hydroxide nanoplates have a type-III nitrogen adsorption-desorption BET isotherm. In preferred embodiments, the isotherm also displays a H3 hysteresis loop.

Antibacterial Composition

The mesoporous magnesium hydroxide nanoplates produced by the method described above may find use in an antibacterial composition. The mesoporous nature and high surface area of the nanoplates produced by the method may be advantageous for antibacterial effects. The nanoplates show antibacterial activity against both gram positive and gram negative bacteria as described below. These nanoplates may be used as a component in an antibacterial composition that takes the form of a solid, liquid, gel, foam, dispersion, colloid, or other type of mixture. In some embodiments, the nanoplates are homogenously distributed throughout the volume of the mixture. In some embodiments, the nanoplates are non-homogenously distributed throughout the volume of the mixture. In some embodiments, the nanoplates may separate from other components of the mixture and require mixing or redispersion before use.

Magnesium hydroxide is generally recognized as safe by the US FDA and is approved for use as a food additive in the European Union (E528). The antibacterial composition comprising the nanoplates may find use as a food additive. In some embodiments, the nanoplates may be added directly to a foodstuff to form an antibacterial composition that comprises the nanoplates and the components of the foodstuff. In some embodiments, the antibacterial composition is pre-formed from other components before being added to the foodstuff.

Magnesium hydroxide is currently a common component in many cosmetics and bath products. The antibacterial composition may also find use in such products. In some embodiments, the antibacterial composition comprising the nanoplates is such a cosmetic or bath product. In some embodiments, the antibacterial composition is a component of a cosmetic or bath product that shows antibacterial activity. Examples of such cosmetics Qr bath products include but are not limited to soaps, facial soaps, facial washes, body washes, shampoos, conditioners, deodorants, antiperspirants, combination deodorants/antiperspirants, fragrances, foot powders, hair dyes or colors, makeup, nail products, personal cleanliness products, shaving products, depilatories, skincare products, tanning products, body or face creams, moisturizers, and anti-acne products.

In some embodiments, the antibacterial composition is not intended for bodily contact or ingestion. In some embodiments, the antibacterial composition is intended to be used in a container, pipe, reservoir, or other such vessel intended to store or transport material, or on a surface. In some embodiments the antibacterial composition is designed to be transiently contacted with the vessel or surface and then removed. In some embodiments, the antibacterial composition is designed to be in contact with the vessel or surface for an extended period of time including the lifetime of either the antibacterial composition or the vessel or surface.

In some embodiments, the antibacterial composition further comprises a surfactant. A surfactant may be present at a weight percentage in a range of 0.02-10 wt %, preferably 0.1-5 wt %, more preferably 0.5-2 wt %. Examples of surfactants and surfactants types that may be included in the antibacterial composition may be those surfactants/surfactant types described previously.

In one embodiment, the antibacterial composition may further comprise a mutual solvent. A mutual solvent may be present at a weight percentage of 1-20 wt %, preferably 3-15 wt %, more preferably 4-12 wt %. As defined herein, a "mutual solvent" is a liquid that is substantially soluble in both aqueous and oleaginous fluids, and may also be soluble in other well treatment fluids. As defined here, "substantially soluble" means soluble by more than 10 grains mutual solvent per liter fluid, preferably more than 100 grams per liter. Mutual solvents are routinely used in a range of applications, controlling the wettability of contact surfaces before and preventing or stabilizing emulsions.

Examples of the mutual solvent include propylene glycol, ethylene glycol, diethylene glycol, glycerol, and 2-butoxyethanol. In a preferred embodiment, the mutual solvent is 2-butoxyethanol, which is also known as ethylene glycol butyl ether (EGBE) or ethylene glycol monobutyl ether (EGMBE). In alternative embodiments, the mutual solvent may be one of lower alcohols such as methanol, ethanol, 1-propanol, 2-propanol, n-butanol, n-hexanol, 2-ethylhexanol, and the like, other glycols such as dipropylene glycol, polyethylene glycol, polypropylene glycol, polyethylene glycol-polyethylene glycol block copolymers, and the like, and glycol ethers such as 2-methoxyethanol, diethylene glycol monomethyl ether, and the like, substantially water/oil-soluble esters, such as one or more C2-esters through C10-esters, and substantially water/oil-soluble ketones, such as one or more C2-C10 ketones.

In some embodiments, the antibacterial composition may further comprise a buffer. As used herein, a buffer (more precisely, pH buffer or hydrogen ion buffer) refers—to a mixture of a weak acid and its conjugate base, or vice versa. Its pH changes very little when a small or moderate amount of strong acid or base is added to it and thus it is used to prevent changes in the pH of a solution. Buffer solutions are used as a means of keeping pH at a nearly constant value in a wide variety of chemical applications. Examples of buffers include, but are not limited to, HEPES buffer, TAPS, Bicine, Glycylglycine, Tris, HEPPSO, EPPS, HEPPS, POPSO, N-ethylmorpholine, TEA (Triethanolamine), Tricine, TAPSO, DIPSO, TES, BES, phosphoric acid, MOPS, imidazole PIPES and the like.

In one embodiment, the antibacterial composition may further comprise other components, such as alcohols, glycols, organic solvents, fragrances, dyes, dispersants, non-buffer pH control additives, acids or bases, water softeners, bleaching agents, foaming agents, antifoaming agents, catalysts, corrosion inhibitors, corrosion inhibitor intensifiers, viscosifiers, diverting agents, oxygen scavengers, carrier fluids, fluid loss control additives, friction reducers, stabilizers, theology modifiers, gelling agents, scale inhibitors, breakers, salts, crosslinkers, salt substitutes, relative permeability modifiers, sulfide scavengers, fibers, microparticles, bridging agents, shale stabilizing agents (such as ammonium chloride, tetramethyl ammonium chloride, or cationic polymers), clay treating additives, polyelectrolytes, non-emulsifiers, freezing point depressants, iron-reducing agents, other biocides/bactericides and the like, provided that they do not interfere with the antibacterial activity of the nanoplates as described herein.

Method of Reducing Nitroaromatic Compounds

The mesoporous magnesium hydroxide nanoplates produced by the method above may find use in a method for reducing nitroaromatic compounds Such a method involves mixing together a nitroaromatic compound, a reducing agent, and the mesoporous magnesium hydroxide nanoplates. The mesoporous nature and high surface area of the nanoplates produced by the above method may be advantageous in accelerating the rate of the reduction of the nitroaromatic compounds. In preferred embodiments, this mixing step takes place in a solvent which can dissolve the nitroaromatic compound. In preferred embodiments, the nanoplates are present in an amount of 1 to 1000 ppm, preferably 10 to 500 ppm, preferably 50 to 150 ppm based on the total amount of the reaction mixture. In preferred embodiments, the rate of the reaction is accelerated by a factor of 1 to 10,000%, preferably 2 to 5,000%, preferably 5 to 1,000% of the rate of the uncatalyzed reaction.

As used herein, a nitroaromatic compound refers to a compound which has one or more aromatic rings and one or more nitro functional groups ($-NO_2$) attached to the aromatic ring(s). Examples of nitroaromatic compounds include, but are not limited to, 4-nitrophenol, nitrobenzene, p-nitrotoluene, p-nitrochlorobenzene, 2,6-dinitrotoluene, o-dinitrobenzene, p-dinitrobenzene, 1-nitronaphthalene, 2-nitronaphthalene, 4-nitrobiphenyl, and 2,4,6-trinitrotoluene. In preferred embodiments, the product of the reduction reaction is an aniline.

In some embodiments, the nitroaromatic compound, reducing agent, and mesoporous magnesium hydroxide nanoplates are mixed in a solvent. Solvents that may be used include an aprotic organic solvent, a protic organic solvent, or preferably, water. Examples of aprotic organic solvents include but are not limited to diethyl ether, tetrahydrofuran, acetonitrile, acetone, N,N-dimethylformamide, dimethylsulfoxide, pentane, hexanes, cyclohexane, benzene, toluene, chloroform, dichloromethane, and ethyl acetate. Examples of protic organic solvents include but are not limited to ammonia, t-butanol, n-butanol, n-propanol, 2-propanol, ethanol, and methanol. In some embodiments, the aprotic organic solvent or protic organic solvent is substantially free of water, oxygen, or both. In preferred embodiments, the solvent is deionized water.

The method for reducing nitroaromatic compounds involves the use of a reducing agent. In some embodiments, the reducing agent is soluble in the solvent. Examples of soluble reducing agents include but are not limited to sodium hydrosulfite, sodium sulfide, tin (II) chloride, titanium (III) chloride, hydroiodic acid, hydrazine, lithium aluminum hydride, borohydrides and borohydride salts such as sodium borohydride, and alkali metal hydrides. In some embodiments, the reducing agent is insoluble in the solvent. Examples of insoluble reducing agents include zinc, samarium, Raney nickel, platinum-on-carbon, and iron. In preferred embodiments, sodium borohydride is used. In preferred embodiments, the mole ratio of the amount of sodium borohydride to the amount of the nitroaromatic compound is 0.5 to 100, preferably 0.75 to 50, preferably 0.80 to 10, preferably 0.9 to 1.5. In some embodiments, the nanoplates are present in an amount of 1 to 1000 mg/L., preferably 5 to 500 mg/L, preferably 10 to 250 mg/L, preferably 25 to 100 mg/L, preferably 50 to 75 mg/L based on the total volume of the reaction mixture.

The examples below are intended to further illustrate protocols for preparing and characterizing the nanoplates, preparing and characterizing the antibacterial composition, and performing the reduction of nitroaromatic compounds and are not intended to limit the scope of the claims.

Where a numerical limit or range is stated herein, the endpoints are included. Also, all values and subranges within a numerical limit or range are specifically included as if explicitly written out.

As used herein the words "a" and "an" and the like carry the meaning of "one or more."

Obviously, numerous modifications and variations of the present invention are possible in light of the above teachings. It is therefore to be understood that, within the scope of the appended claims, the invention may be practiced otherwise than as specifically described herein.

All patents and other references mentioned above are incorporated in full herein by this reference, the same as if set forth at length.

EXAMPLES

Results and Discussion

Characterization of Magnesium Hydroxide Nanoplatelets
X-Ray Powder Diffraction

Figure 1B:
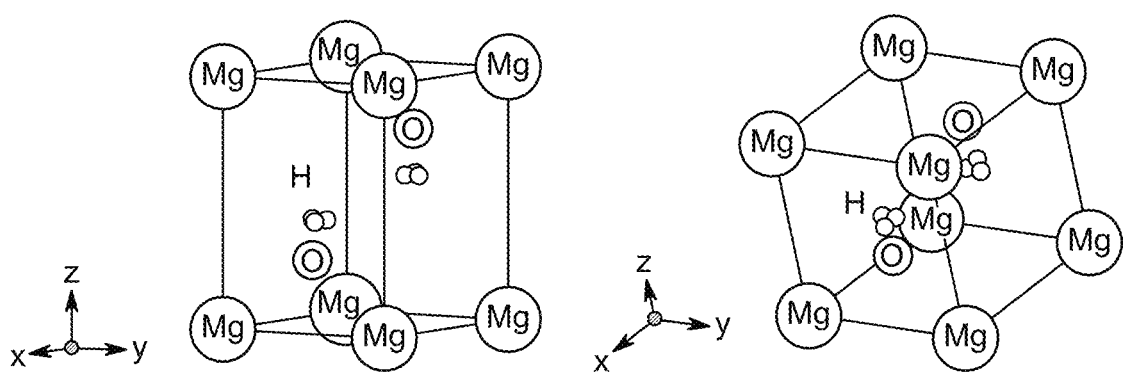
FIG. 1B shows a structural model of $Mg(OH)_2$ obtained after the analysis of the XRD pattern.
Figure 2A:
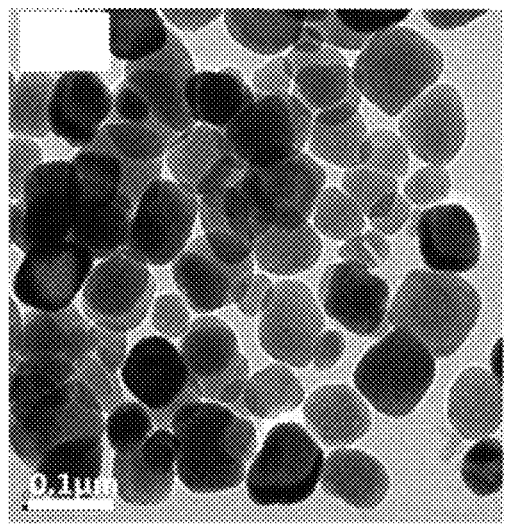
FIG. 2A is a TEM image of $Mg(OH)_2$ nanoplates at low magnification.
Figure 2B:
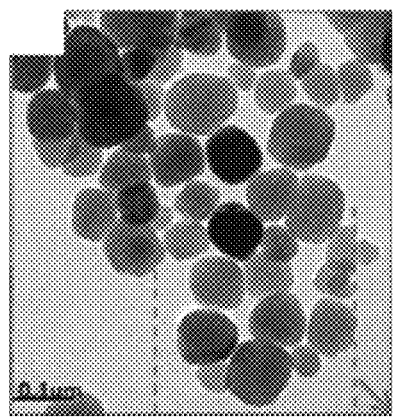
FIG. 2B is a TEM image of $Mg(OH)_2$ nanoplates at low magnification with a selected area highlighted.
Figure 2C:
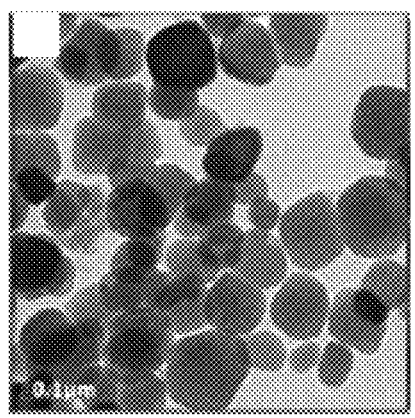
FIG. 2C is a TEM image of $Mg(OH)_2$ nanoplates at low magnification.
Figure 2D:
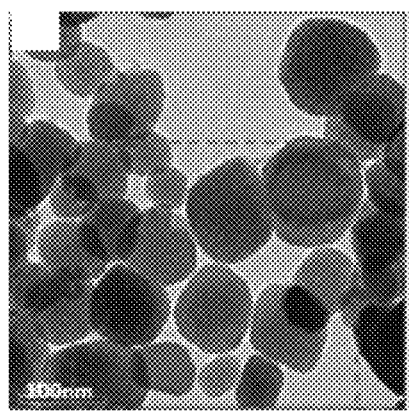
FIG. 2D is a TEM image of $Mg(OH)_2$ nanoplates at moderate magnification with a selected area highlighted.
Figure 2E:
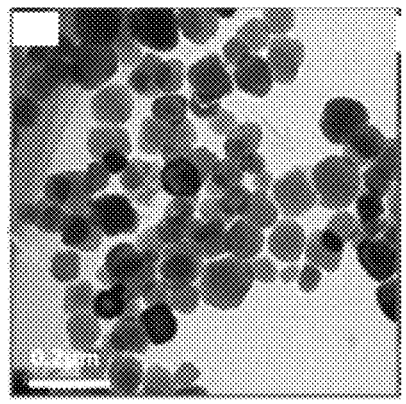
FIG. 2E is a TEM image of $Mg(OH)_2$ nanoplates at low magnification.
Figure 2F:
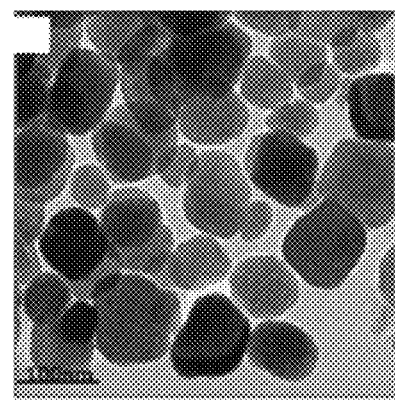
FIG. 2F is a TEM image of $Mg(OH)_2$ nanoplates at moderate magnification.
Figure 2G:
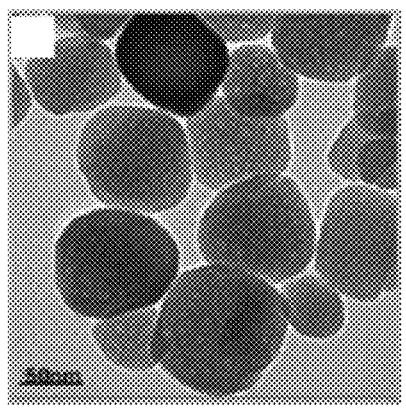
FIG. 2G is a TEM image of $Mg(OH)_2$ nanoplates at high magnification from the selected area of FIG. 2B.
Figure 2H:
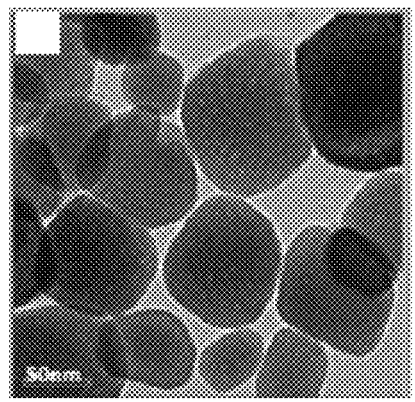
FIG. 2H is a TEM image of $Mg(OH)_2$ nanoplates at high magnification from the selected area of FIG. 2D.
Figure 2I:
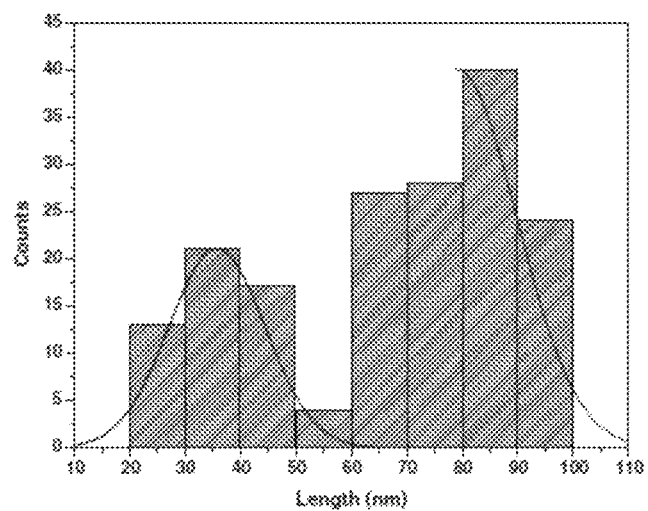
FIG. 2I shows a size distribution histogram of nanoplates calculated from TEM images.

The composition and structural parameters of the prepared product were investigated by XRD. The XRD pattern is shown in FIG. 1A. Diffraction peaks were observed at 2θ values 18.50°, 32.78°, 38.07°, 50.74°, and 58.65°, which clearly indicate that the product is magnesium hydroxide ($Mg(OH)_2$) (PDF #96-210-1439). The Miller indices (hi(1) and d-spacing of these peaks are given in Table 1. $Mg(OH)_2$ belong to the space group P-3 ml with space group number 164. It belongs to the trigonal crystal system. The values of unit cell parameters and atomic coordinates were calculated and are given in Table 1. These values are used to construct the structural model of $Mg(OH)_2$ given in FIG. 1B. Magnesium is present at the corners while oxygen and hydrogen are present within the unit cell. All the eight corners are occupied by magnesium (green spheres). Two oxygen atoms (red spheres) and two hydrogen atoms (blue spheres) are present per unit cell. Position of one hydrogen atom is represented by three blue spheres in FIG. 1B according to the three-site split-atom model. Because of the unusual thermal motion of the hydrogen atom, a single hydrogen atom is distributed into three positions with equal occupation rate [L. Desgranges, G. Calvarin, G. Chevrier, Acta Crystallogr. B 1996, 52, 82]. The Mg—Mg bond distances along y— and z-axis were calculated and are given in Table 1. The O—H and H—H bond distances are also given in Table 1.

TABLE 1

Details of various structural parameters of $Mg(OH)_2$ obtained from XRD pattern

| Property | Details |
|---|---|
| Name | Magnesium hydroxide |
| Chemical formula | $Mg(OH)_2$ |
| Space group | P-3 ml (164) |
| Crystal system | Trigonal (hexagonal axes) |
| No. of formula units per unit cell | 1 |
| Unit cell parameters | |
| Lengths (Å) | a = 3.1480 c = 4.7790 |
| Angles (°) | α = 90.0 and γ = 120.0 |
| Atomic coordinates | |
| Mg | x = 0.000, y = 0.000, and z = 0.000 |
| O | x = 0.333, y = 0.667, and z = −0.219 |
| H | x = 0.362, y = 0.638, and z = −0.416 |
| Distances (Å) | |
| Mg—Mg (along z-axis) | 3.148 |
| Mg—Mg (along y-axis) | 4.77900 |
| O—O | 3.24296 |
| O—H | 0.95435 |
| H—H | 1.70567 |
| 2θ (°), d-spacing (Å) and Miller indices (hkl) | 18.50, 4.7790, and (0 0 1) |
| | 32.78, 2.7262, and (1 0 0) |
| | 38.07, 2.3680, and (0 1 1) |
| | 50.74, 1.7970, and (0 1 2) |
| | 56.65, 1.5740, and (1 1 0) |

Transmission Electron Microscopy

In order to investigate the morphology of the $Mg(OH)_2$ product, TEM was used, and the results are shown in FIG. 2A-2H. FIG. 2A-2D show the overview of the product. It is clear from these figures that the product is well separated and no agglomeration is present among the particles of $Mg(OH)_2$.

There are two types of particles present in the product. One is smaller with a narrow size range 20-50 nm, and the other is relatively large with the size range 50-100 nm. Overall, the size distribution of product ranges from 20 to 100 nm. The size of many nanoplatelets was calculated from the TEM images along their longest diameter, and the size distribution histogram was constructed (FIG. 21). This plot shows two maxima, which show that two size ranges are present. One type of particles is small while the other type is large. Descriptive statistics were performed on the size distribution data using OriginPro 8. The mean, median, mode, kurtosis, and skewness were calculated for both types of particles, which were found to be 35.85, 34.84, 34.84, −1.02, −0.037, respectively, for small particles. The values of mean, median, and mode are very close to each other. The value of skewness is −0.03 and the value of kurtosis is less than 3. This confirms that the dataset is normally distributed (Gaussian distribution). The values of mean, median, mode, kurtosis, and skewness were found to be 79.07, 80, 85.97, −1.04, −0.4, respectively, for the large particles. The values of mean and median lie close to each other but the value of mode does not lie close to the mean and median values. The values of kurtosis and skewness are also greater than 0.03 and 3, respectively. These deviations in the values indicate that size distribution of the large particles is not normal. This size distribution shows that the product is formed by the Ostwald ripening mechanism, which affects their Gaussian size distribution. These particles have platelet-like morphology with irregular edges. These nanopartides are very thin-layered, and the high-resolution image of these nanoparticles shows a contrast of dark and light colors, which might be attributed to the thin walls (only a few atoms thick walled platelets) with porous morphology or to their hollow inside. A closer look of these nanoparticles reveals that the surface of these particles is not smooth but rough. The rough surface supports the presence of pores, so it can be assumed that the product consists of porous nanoplatelets of $Mg(OH)_2$.

Surface Analysis

Figure 3A:
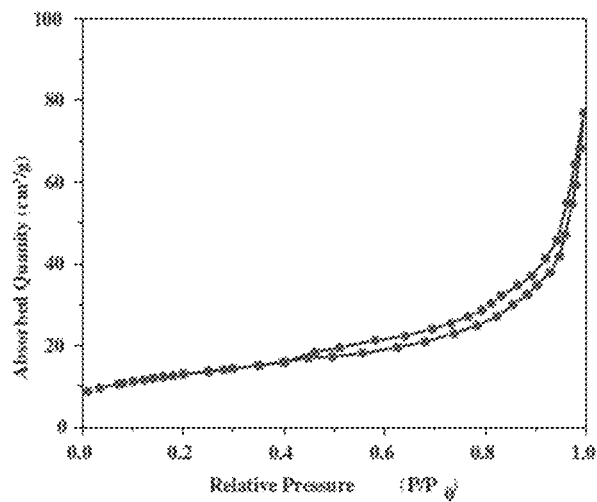
FIG. 3A shows a nitrogen adsorption-desorption BET isotherm of $Mg(OH)_2$ nanoplates.
Figure 3B:
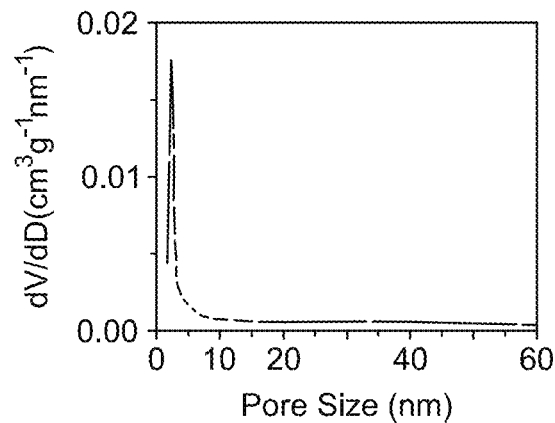
FIG. 3B. shows the corresponding BJH pore size distribution from the BET isotherm of FIG. 3A.

FIG. 3 displays the nitrogen adsorption-desorption isotherm and the corresponding Barrett Joyner-Halenda (BJH) pore size distribution curve (the insert) of the samples. It can be seen that the isotherm is characterized by the distinct type-III curve with H3 hysteresis loop, which is characteristic of mesoporous structural materials with a hysteresis loop. Moreover, it is seen that the BJH pore size distribution is narrow with uniform pores with a well-organized, ordered porosity with a pore size of 5.01 nm. The Bnnauer-Emmett Teller (BET) specific surface area was 59.2 m²/g. Compared to that of the bulk samples, the pore size exhibits a narrower distribution as the reaction temperature is increased; it has also a relatively high surface-to-volume ratio.

Formation Mechanism

Statistical data analysis showed that the nanoplatelets possess a rhombic structure. During the growth process, rhombic unit cells are arranged to form the nanoplatelet morphology. $Mg(OH)_2$ nanoplatelets are formed by the following reaction mechanism:

(1)

(2)

(3)

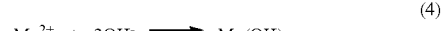
(4)

$$2CH_3COO^- + 2H^+ \longrightarrow 2CH_3COOH \quad (5)$$

$$CH_3COOH + 2O_2 \xrightarrow{\Delta} 2H_2O + 2CO_2 \quad (6)$$

Antibacterial Application

Figure 4A:
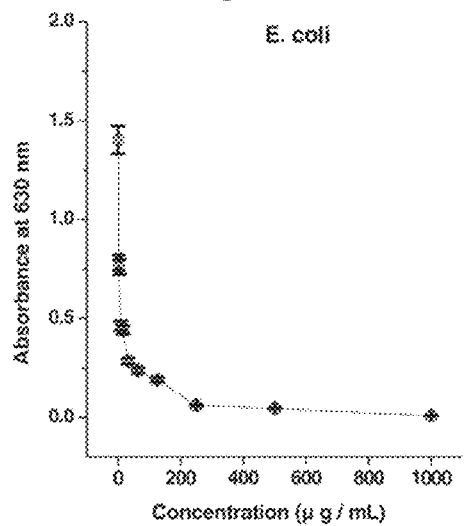
FIG. 4A shows data for the determination of MIC and MBC of $Mg(OH)_2$ nanoplates against *E. coli*.

Determination of the MIC and MBC MIC and MBC of all tested bacterial strains against Mg(OH)$_2$ nanoplatelets were tested with the help of the redox dye nitro-blue tetrazolium chloride (NBT). NBT $\lambda_{max}$ 630 nm) absorbs in the visible region, so it was used to count the number of viable bacterial cells (Beer-Lambert law). NBT is positively charged, while the bacterial wall is negatively charged because of the presence of lipids and other moieties. So NBT gets easily adsorbed on the surface of bacteria and makes visible the presence of bacteria. A plot of the absorbance as a function of the concentration of Mg(OH)$_2$ nanoplatelets is shown in FIG. 4A. It is observed that number of bacteria decreased with the increase in concentration of the Mg(OH)$_2$ nanoplatelets. The MIC of the nanoplatelets against *E. coli, K. pneumonia*, and *S. aureus* strains was 250, 500, and 500 µg/mL respectively. The MBC of the nanoplatelets against all tested strains was 1,000 µg/mL. The nanoplatelets showed maximum activity against *E. coli* and minimum activity against *S. aureus*. This might be due to the difference in the cell wall composition of the strains. Although *E. coli* and *K. pneumoniae* are both Gram-negative strains, the MIC values of the nanoplatelets against these Gram-negative strains are different. This shows that some factors other than the cell wall composition are also involved in the antibacterial activity of Mg(OH)$_2$ nanoplatelets.

Figure 4B:
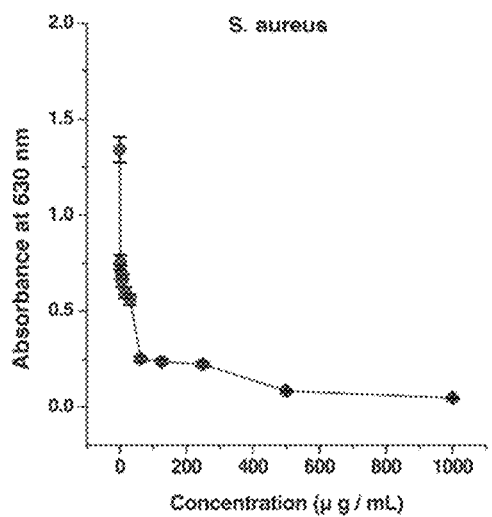
FIG. 4B shows data for the determination of MIC and MBC of $Mg(OH)_2$ nanoplates against *S. aureus*.
Figure 4C:
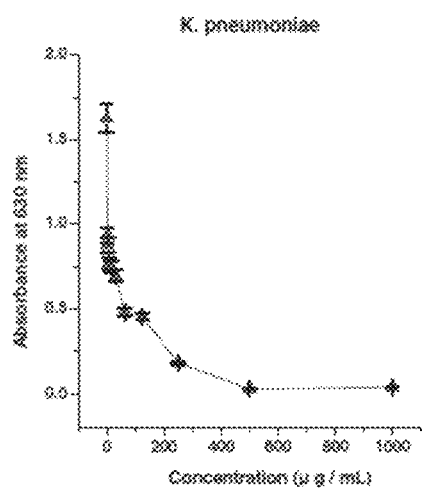
FIG. 4C shows data for the determination of MIC and MBC of $Mg(OH)_2$ nanoplates against IC *pneumoniae*.
Figure 4D:
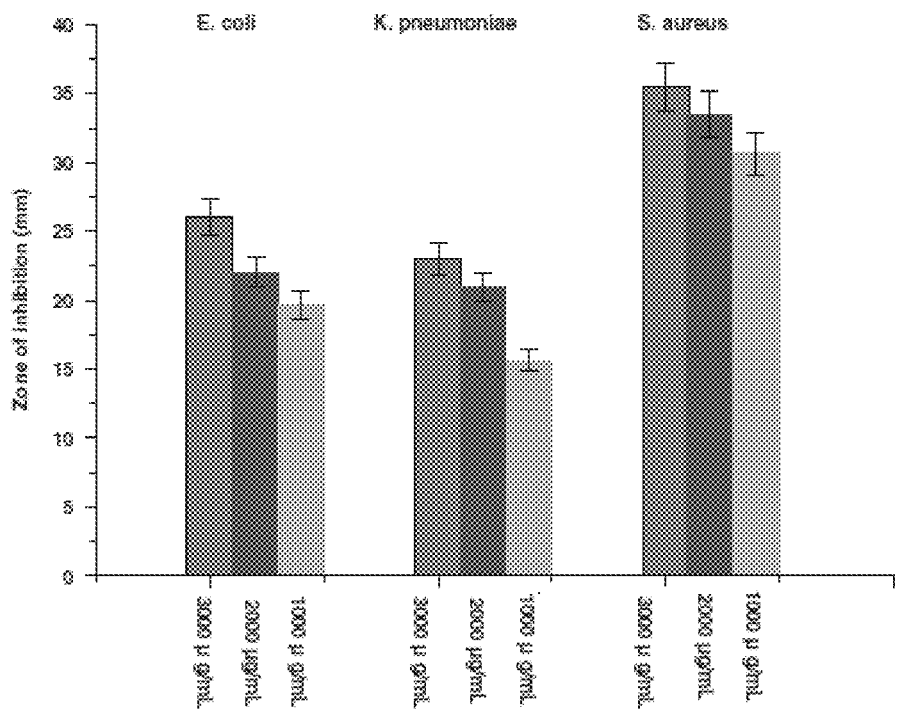
FIG. 4D shows the radius of the zone of inhibition at different concentrations of $Mg(OH)_2$ nanoplates against selected bacteria by the well diffusion method.

Investigation of dose-dependent antibacterial activity The dose-dependent bactericidal activity of the nanoplatelets was studied by the well diffusion method. The diameter of the zone of inhibition was measured to evaluate the growth of bacteria. The bactericidal activity was studied in the range of concentration 1,000 3,000 µg/mL of the nanoplatelets against all bacterial strains. This concentration range is higher than the MIC and MBC of the nanoplatelets against all strains. It can be observed from FIG. 4B that the diameter of the zone of inhibition increased with the increase in concentration of the nanoplatelets. The available surface area increases with the increase in concentration of the nanoplatelets, so the antibacterial activity increases with increase in dose. The maximum activity was observed against *S. aureus* followed by *E. coli* and *K pneumoniae*. The cell wall thickness of Gram negative bacteria is smaller than that of Gram-positive bacteria, so the antibacterial action of the nanoplatelets is more pronounced in case of the former (*S. aureus*) compared to that of the latter (*E. coli* and *K. pneumoniae*). Mg(OH)$_2$ nanoplatelets adhere to the surface of bacteria initially and then diffuse into the cells through the porous membrane. Mg(OH)$_2$ nanoplatelets are of very small size, so they can easily produce alterations in the chemical reaction series within the cells. This causes the disruption of the cells and kills bacteria.

Evaluation of Mg(OH)$_2$ Nanoplatelet Activity on Biofilm Formation

Figure 5A:
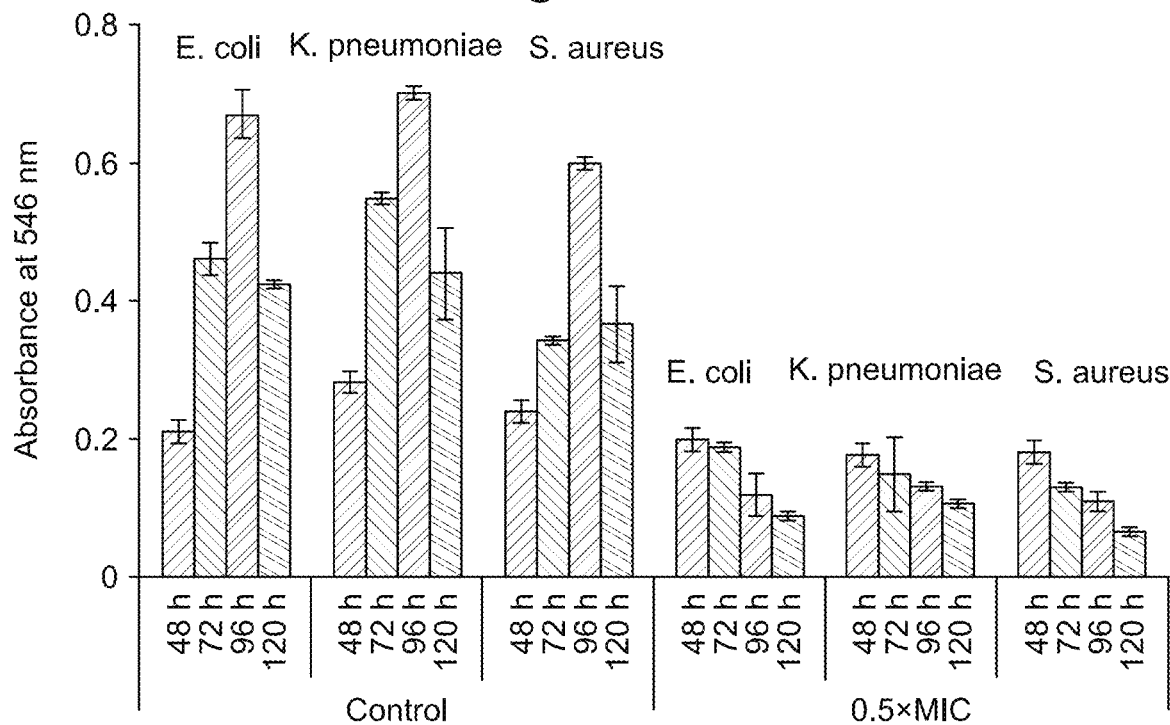
FIG. 5A shows the effect of control and sub-inhibitory concentration of $Mg(OH)_2$ nanoplates against biofilm formation for antibiotic-resistant bacteria.
Figure 5B:
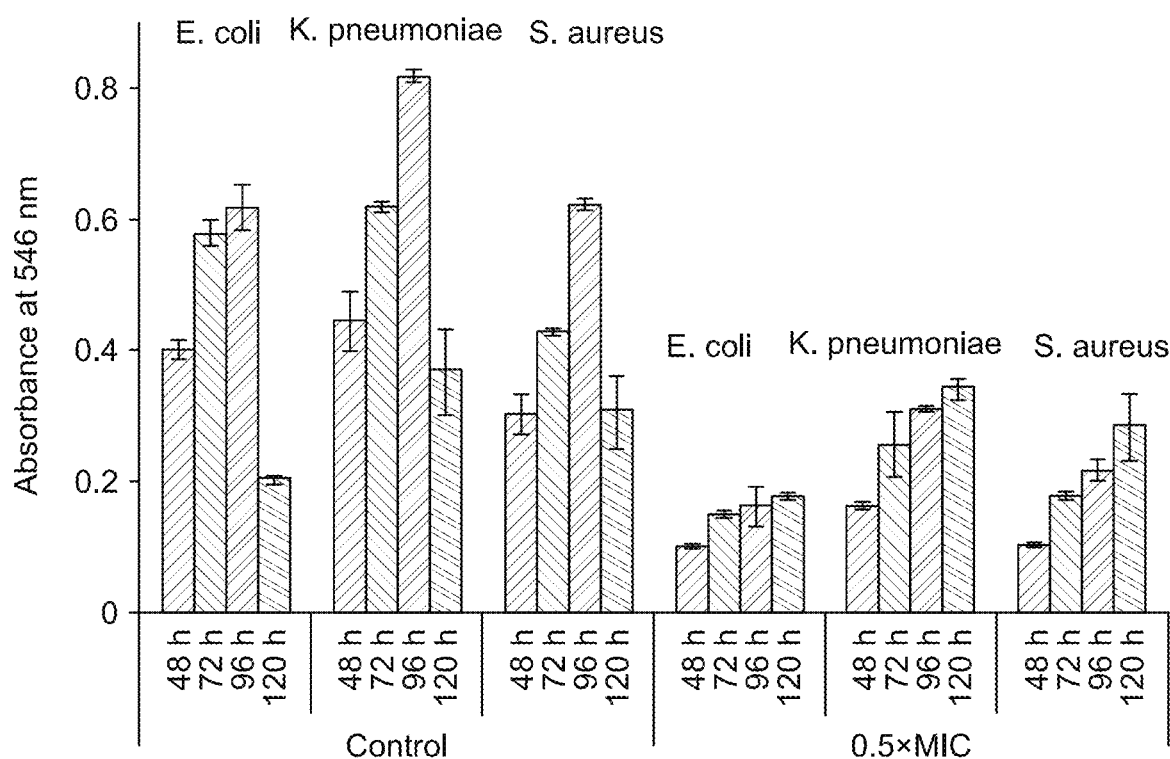
FIG. 5B shows the effect of control and sub-inhibitory concentration of $Mg(OH)_2$ nanoplates against established biofilms for antibiotic-resistant bacteria.

The effect of sub-inhibitory concentration (0.5×MIC) of Mg(OH)$_2$ nanoplatelets on biofilm formation of the three selected strains was measured by using microtiter plate assay. Biofilm formation was quantified after 48, 72, 96, and 120 hr after staining the adhered cells with crystal violet (CV) (FIG. 5A). For all three tested strains, maximum biofilm forming capacity was observed after 96 hr of incubation in control and treated cells. Biofilm formation decreased when the duration of interaction was increased from 96 to 120 hr. The results of absorbance at 546 nm revealed that *K pneumoniae* had the highest ability to form biofilms, followed by *S. aureus* and *E. coli*. Moreover, the biofilm formation decreased with increase in the duration of contact of the nanoplatelets. The ability of Mg(OH)$_2$ nanoplatelets to exhibit antibiofilm properties against already established mature biofilms was also studied using microliter plate assay at intervals of 48, 72, 96, and 120 hr. After a given time interval, the biofilms formed by the bacterial strains were exposed to nanoplatelets (0.5×MIC) for 24 hr. The results revealed that *K pneumoniae* had a greater capacity to form biofilm in comparison with *E. coli* and *S. aureus* (FIG. 5B). Forty eight-hour-old biofilms treated with the nanoplatelets showed more decline in biofilm viability than 72-hr-old biofilms. Thus with the passage of time, the nanoplatelets showed less ability to decrease biofilm viability. All the three selected strains (*E. coli, K. pneumonia*, and *S. aureus*) displayed the same trend. Similarly, 72-hr-old biofilms treated with Mg(OH)$_2$ nanoplatelets exhibited more decline in biofilm viability than 120-hr-old films. At 120 hr, Mg(OH)$_2$ nanoplatelets were less effective and had almost no activity (FIG. 5B). These results show that the nanoplatelets possess high antibacterial activity. Actually, their high specific surface area and porous structure favor the nanoplatelets to show high antibacterial activity. That is why they can be useful to preserve materials in glass containers.

Catalytic Application

Figure 6A:
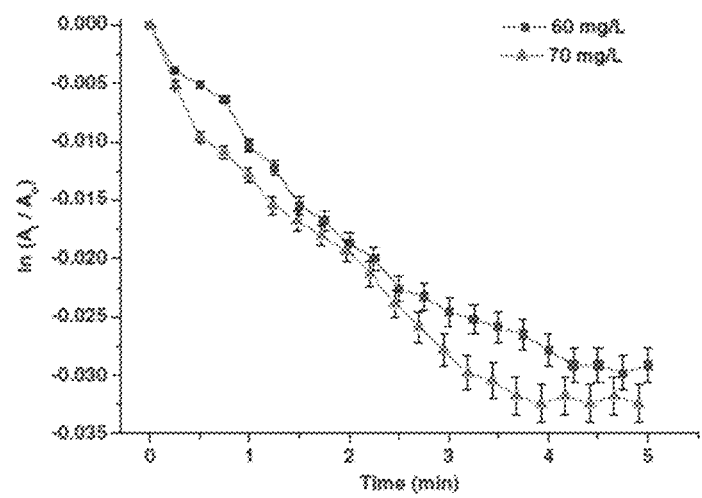
FIG. 6A shows a plot of $\ln(A_t/A_o)$ versus time for the catalytic reduction of 4-NP in aqueous medium for two different concentrations of $Mg(OH)_2$ nanoplates as catalyst.
Figure 6B:
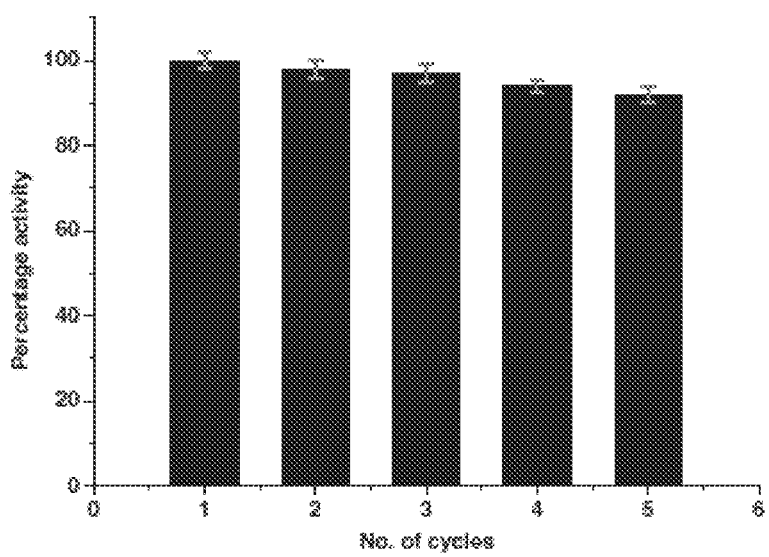
FIG. 6B shows a plot of the percentage activity of the catalyst ($Mg(OH)_2$ nanoplates) versus the number of cycles for the catalytic reduction of 4-NP.

Reduction of 4-NP was chosen as a model reaction to investigate the catalytic activity of Mg(OH)$_2$ nanoplatelets. 4-NP is commonly present in industrial waste water because it is used in pharmaceutical and textile industries and in organic synthesis [A. Chwalibog, E. Sawosz, A. Hotowy, J. Szeliga, S. Mitura, K. Mitura, M. Grodzik, P. Orlowski, A. Sokolowska, Int. J. Nanomed. 2010, 5, 1085]. 4-NP is converted into 4-aminophenol (4-AP) through reduction with the help of a reducing agent. 4-AP is much less dangerous than 4-NP. Moreover, 4-AP is used in the polymer industry. Thus this reaction is very important environmentally as well as economically. The nanoplatelets can increase the speed of reaction many times. Thus, the product is formed in a shorter period of time. Here, the catalytic reduction of 4-NP was monitored with the help of UV-visible spectrophotometry because 4-NP strongly absorbs at 400 nm in a basic medium [X. Le, Z. Dong, X. Li, W. Zhang, M. Le, J. Ma, Catal. Commun. 2015, 59, 21]. The concentration of NaBH4 is kept 100 times (or more) greater than that of 4-NP, so the catalytic reduction obeys pseudo-first-order kinetics. Plot of ln(At/Ao) as a function of time for catalysis is shown in FIG. 6A. In this plot, the value of ln(At/Ao) decreases with time. This shows that catalysis is in progress and 4-NP is rapidly being converted into 4-AP. After 4 min, the value of ln(At/Ao) becomes constant, which shows that the catalysis has completed. Apparent rate constant (kapp) was calculated from the slope of this graph, which was found to be 0.0067 and 0.0072/min at 60 and 70 mg/L catalyst dosages. These values of kapp are greater than those of many other reported catalysts under the same conditions [M. Nasrollahzadeh, S. M. Sajadi, A. Rostami-Vartooni, M. Bagherzadeh,R. Safari, J. Mol. Catal. A 2015, 400, 22; and S. Gu, J. Kaiser, G. Marzun, A. Ott, Y. Lu, M. Ballauff, A. Zaccone,S. Barcikowski, P. Wagener, Catal. Lett. 2015, 145, 1105.]. The greater value of kapp is due to the high specific surface area and porous structure of the nanoplatelets. The value of kapp for 70 mg/L is found to be greater than that of 60 mg/L catalyst dosage. The number of surface sites for catalysis has increased with the increase in catalyst dosage. That is why the value of kapp at 70 mg/L is greater than that at 60 mg/L. Reusability of the catalyst was also investigated up to five cycles of usage (FIG. 6B). It was found that the catalytic activity decreased by only 6% after four recycles. It means that the nanoplatelets can be successfully used again and again.

EXPERIMENTAL

Materials

Magnesium chloride ($MgCl_2$), sodium acetate ($CH_3COON_a$), ethylene glycol, and dimethylsulfoxide (DMSO) were purchased from Sigma-Aldrich (USA). All chemicals were used as received without any further purification. Three isolated and ribotyped antibiotic-resistant strains, E. coli (kt273995), K. pneumoniae (kt273996), S. aureus (kt250728), were obtained from the Department of Microbiology and Molecular genetics, University of the Punjab, Lahore, Pakistan. The bacterial culture was maintained in Luria-Bertani (LB) broth and agar purchased from Merck (Germany).

Synthesis of Magnesium Hydroxide Nanoplatelets $Mg(OH)_2$ nanoplatelets were produced by the solvothermal method. Twenty milliliters of 1 M $CH_3COON_a$ solution was dropwise added into 20 mL of 0.5 M $MgCl_2$ solution. The reaction mixture was stirred for 15 min at room temperature. Then 10 mL of ethylene glycol was added into it and reaction mixture was further stirred for 15 min. Then reaction mixture was heated at 180° C. for 8 hr in an autoclave solvothermal reactor. The white precipitates formed were collected by centrifugation and the pellets were washed thrice with deionized water and thrice with methanol. The obtained white product was dried overnight at 60° C. under vacuum.

Applications of Magnesium Hydroxide Nanoplatelets

Antibacterial Application

The MIC and MBC of $Mg(OH)_2$ nanoplatelets against all the three strains were evaluated by the broth-microdilution method [S. Gu, J. Kaiser, G. Marzun, A. Ott, Y. Lu, M. Ballauff, A. Zaccone, S. Barcikowski, P. Wagener, Catal. Lett. 2015, 145, 1105; and Z. Dong, X Le, C. Dong, W. Zhang, X. Li, J. Ma, Appl. Catal., B 2015, 162, 372]. Using 96-wells microliter plates, 100 μL of $Mg(OH)_2$ nanoplatelet suspension (2,000 μg/mL) was dispensed into well 1 and serially diluted across the plate up to well 10. Then 100 μL of LB broth and 100 μL of 5×105 CFU/mL bacterial inoculum were added into wells 1-12, leaving well 11 empty for sterile control, and incubated at 37° C. for 18-24 hr. The redox dye NBT (0.2 mg/mL) was used to detect the bacterial growth by the color change from yellow to blue. After 24 hr, the absorbance of each plate was measured at 630 nm by a microplate reader. All MIC measurements were carried out in triplicate. MBC was determined by aspirating 100 μL of the culture medium from the wells (at MIC and above MIC) and sub culturing it on fresh LB agar followed by incubation at 37° C. for 24-48 hr. Antibacterial activity of various concentrations of $Mg(OH)_2$ nanoplatelets against all three bacterial strains was examined by the well diffusion method. Absolute methanol was used as negative control. The inoculum suspension of 0.5 McFarland standard of each bacterial strain was subcultured on the surface of LB agar plates. Wells of 5 mm diameter were made aseptically on the LB plates. One hundred microliters of various concentrations of $Mg(OH)_2$ nanoplatelets (3,000, 2,000, and 1,000 μg/mL) was dispensed into separate wells and the plates were incubated at 37° C. for 24 hr. The antimicrobial susceptibility was examined by measuring the diameter of the zones of inhibition expressed in millimeters against the tested strains. To investigate the antibiofilm activity of the nanoplatelets, 0.1 mL of bacterial culture (1.5×108 CFU/mL) and 0.1 mL of LB broth containing $Mg(OH)_2$ nanoplatelets (subinhibitory concentration, 0.5×MIC) were transferred into 96-well microtiter plates. Then microtiter plates were incubated aerobically for 48, 72, 96, and 120 hr at 37° C. After 48, 72, 96, and 120 hr, the growth medium was disposed of and the microtiter plate wells were washed twice with 200 NL normal saline to remove nonadherent cells and subsequently air-dried in an inverted position for 30 min. The adherent biofilm was fixed with 95% ethanol and was stained with 200 μL of 1 v/v % CV for 20 min at room temperature. Overabundant dye was expelled by washing each well thrice with 200 μL of sterile normal saline. Quantification of the attached cells was done by adding 200 μL of glacial acetic acid (33 v/v %) as a CV dissolvable to elute the stained cells. Thereafter, the absorbance at 546 nm wavelength of dissolved CV was measured using a microplate reader (BioRad, Microplate Reader-680XR). The experiment was performed in triplicate, and sterile LB broth containing $Mg(OH)_2$ nanoplatelets was utilized as negative control while LB broth containing bacterial strains was utilized as positive control. The same protocol was used to study the effect of $Mg(OH)_2$ nanoplatelet activity on established biofilm on a 96-well microtiter plate.

Catalytic Application

Twenty microliters of 0.1 mM 4-NP, 8 mL of 25 mM NaBH4, 64 mL deionized water, and 8 mL of catalyst dispersion were added into a cuvette. Then, absorbance at 400 nm (A max of 4-NP at pH≥9) was measured after every 15 s on a UVD-3500 spectrophotometer. Absorbance was measured until it became constant. The kinetics of catalysis was studied using the equation $\ln(A_t/A_0) = -k_{app} \times t$, where $A_0$ and $A_t$ are the absorbance at 400 nm at 0 time and time 1, respectively. kapp is the apparent rate constant of catalysis.

Characterization

XRD patterns were obtained on a Rigaku D/max Ultima III Xray diffractometer with a Cu Kα radiation source ($\lambda=0.15406$ nm) operated at 40 kV and 150 mA and at scanning steps of 0.02° in the 2θ range 10-60°. TEM observations were carried out on an FEI Tecnai G2 S-Twin transmission electron microscope with an accelerating voltage of 200 kV. A twin surface area analyzer (Quantachrome Instruments, USA) was used to measure the surface area of the product using nitrogen at −196° C. temperature and degassing at 200° C. for 1 hr. The specific surface area of the samples was calculated using the BET method, and the BJH model was applied to the pore size distributions derived from the desorption branches of the isotherms. Catalytic activity was monitored using a UVD3500 spectrophotometer (Laboomed, Inc., USA).

The invention claimed is:
1. A method for making mesoporous magnesium hydroxide nanoplates with a diameter of 20 nm to 100 nm and a thickness of 0.5 to 30 nm, the method comprising:
heating an aqueous mixture of a magnesium salt, a base, and a glycol having 2 to 6 carbon atoms at a temperature of 140 to 220'C for 1 to 24 hours,
wherein the aqueous mixture is substantially free of a surfactant, a template, or both, and wherein the heating forms a precipitate containing the mesoporous magnesium hydroxide nanoplates;

wherein the mesoporous magnesium hydroxide nanoplates are hollow having a thin-walled shell surrounding an interior void;

wherein the thin-walled shell has a thickness of 0.1-10 nm;

wherein the mesoporous magnesium hydroxide nanoplates are not agglomerated.

2. The method of claim 1, wherein the magnesium salt is a magnesium halide.

3. The method of claim 2, wherein the magnesium halide is magnesium chloride.

4. The method of claim 1, wherein the magnesium salt is present in the aqueous mixture in an amount of 15 to 25 g/L.

5. The method of claim 1, wherein the base is a monoacidic base.

6. The method of claim 1, wherein the base is an acetate base.

7. The method of claim 1, wherein the base is sodium acetate.

8. The method of claim 1, wherein the base is present in the aqueous mixture in an amount of 25 to 40 g/L.

9. The method of claim 1, wherein a mole ratio of the amount of base present in the aqueous mixture to the amount of magnesium present in the aqueous mixture is 1:1 to 3:1.

10. The method of claim 1, wherein the glycol is ethylene glycol.

11. The method of claim 1, wherein the glycol is present in the aqueous mixture in an amount of to 25 volume %, based on a total volume of the aqueous mixture.

12. The method of claim 1, wherein the aqueous mixture is formed by mixing the magnesium salt and the base in water for 1 to 30 minutes, followed by the addition of the glycol.

13. The method of claim 12, wherein after the addition of the glycol, the aqueous mixture is mixed for 1 to 30 minutes before the heating.

14. The method of claim 1, wherein the mesoporous magnesium hydroxide nanoplates have a mean pore diameter of 2 to 10 nm, a surface area of 50 to 70 $m^2/g$, and a type-III nitrogen adsorption-desorption BET isotherm with a H3 hysteresis loop.

15. The method of claim 1, wherein the mesoporous magnesium hydroxide nanoplates have a multimodal size distribution.

* * * * *